United States Patent
Hannon et al.

(10) Patent No.: US 7,312,424 B2
(45) Date of Patent: Dec. 25, 2007

(54) APPARATUS AND A METHOD FOR COOKING GARLIC

(76) Inventors: Todd J. Hannon, 5611 381 Ave., Burlington, WI (US) 53105; Georgia A. Hannon, 5611 381 Ave., Burlington, WI (US) 53105

( * ) Notice: Subject to any disclaimer, the term of this patent is extended or adjusted under 35 U.S.C. 154(b) by 789 days.

(21) Appl. No.: 10/818,391

(22) Filed: Apr. 5, 2004

(65) Prior Publication Data

US 2005/0220955 A1    Oct. 6, 2005

(51) Int. Cl.
A47J 27/04    (2006.01)
A47J 36/16    (2006.01)
A23L 1/212    (2006.01)

(52) U.S. Cl. .................. 219/432; 219/386; 219/401; 219/433; 99/426; 99/440; 426/510

(58) Field of Classification Search .............. None
See application file for complete search history.

(56) References Cited

U.S. PATENT DOCUMENTS 3,143,639 A * 8/1964 Wickenberg et al. ......... 99/440
3,720,156 A * 3/1973 Hentschel et al. ............ 99/332
4,509,412 A * 4/1985 Whittenburg et al. ....... 219/401
5,809,871 A * 9/1998 Arathoon .................... 99/426
6,525,299 B2 * 2/2003 Hannon et al. ............. 219/385

* cited by examiner

Primary Examiner—Joseph M. Pelham
(74) Attorney, Agent, or Firm—Jansson Shupe & Munger Ltd.

(57) ABSTRACT

An apparatus and method for use in cooking bulbs of garlic are described. The apparatus (100) includes a bowl (102) and a top (104). An insert (122) that releases moisture during cooking is supported on a bottom (108) of the bowl (102). A holder (124), which is capable of holding garlic, is supported on the insert (122). A cooking chamber (118) is formed when the top (104) is positioned on the bowl (102). The escape of heat and vapor from the cooking chamber (118) are resisted by the engagement of a top rim (116) to a complementary bowl rim (112). A heating element (120) that is disposed near an outside surface of the bowl (102) provides the heat to cook garlic when the heating element (120) is connected to a power source by a cord (134).

20 Claims, 4 Drawing Sheets

APPARATUS AND A METHOD FOR COOKING GARLIC

CROSS-REFERENCE TO RELATED APPLICATIONS

Not Applicable

STATEMENT REGARDING FEDERALLY SPONSORED RESEARCH/DEVELOPMENT

The present invention does not involve any form of federally sponsored research or development.

BACKGROUND OF THE INVENTION

The present invention relates to apparatus and methods for cooking foodstuffs, including, but not limited to, a cooker for use in cooking garlic. Apparatus and methods for use in cooking garlic are known. Garlic is one of the oldest and most popular flavoring herbs in the world having been used as a food and medicine for centuries by all cultures. Over two hundred million pounds of garlic are produced annually in the United States. Roasted garlic is a favorite appetizer both in homes and restaurants and there are many recipes that call for its addition. Typically, garlic is cooked in a container or simply wrapped in aluminum foil that is placed in an oven. Usually oil is added to the container before the container with garlic inside is placed in a conventional oven at 350 to 400 degrees for approximately 45 minutes. At lower temperatures the cooking time is increased. Multiple compartment garlic cookers that are also placed in the oven allow for basting of the garlic, but cooking times are approximately the same.

There are a number of problems with existing cookers used to cook garlic. For cookers that are placed in a conventional oven, cooking times are long and the cooking wastes a large amount of energy, particularly, when cooking only one or a few bulbs of garlic. Garlic cooked in oil becomes soft and difficult to remove from the cooker of when cooked at high temperatures or for long times, garlic may dry out.

Accordingly, there is a need for an apparatus for and method of more efficiently cooking small quantities of garlic that reduces garlic cooking time and energy, produces moist cooked garlic, and facilitates the removal of cooked garlic from the cooker.

BRIEF SUMMARY OF THE INVENTION

An apparatus and a method for use in cooking garlic are provided. The apparatus includes a bowl and a top that have complimentary beveled rims that engage and form a cooking chamber when the apparatus is in a closed position. The apparatus also comprises a holder that contains garlic for easy removal once cooked, and an insert that releases water during garlic cooking. In a method of the present invention, an insert is soaked in water, and placed in the bowl. A holder with garlic inside is placed in the bowl and the top having a complementary rim to the rim on the bowl is closed onto the bowl so as to resist the escape of vapor and moisture released by the insert during cooking.

DETAILED DESCRIPTION OF THE PREFERRED EMBODIMENT

An apparatus and method for cooking garlic are described. The apparatus includes a bowl that is hinged to a top. When the apparatus is closed by placing the top on the bowl, complementary beveled rims allow the formation of a cooking chamber that resists the escape of heat and vapor. An insert that holds water and a holder that is capable of holding garlic are supported inside the bowl.

Figure 1:
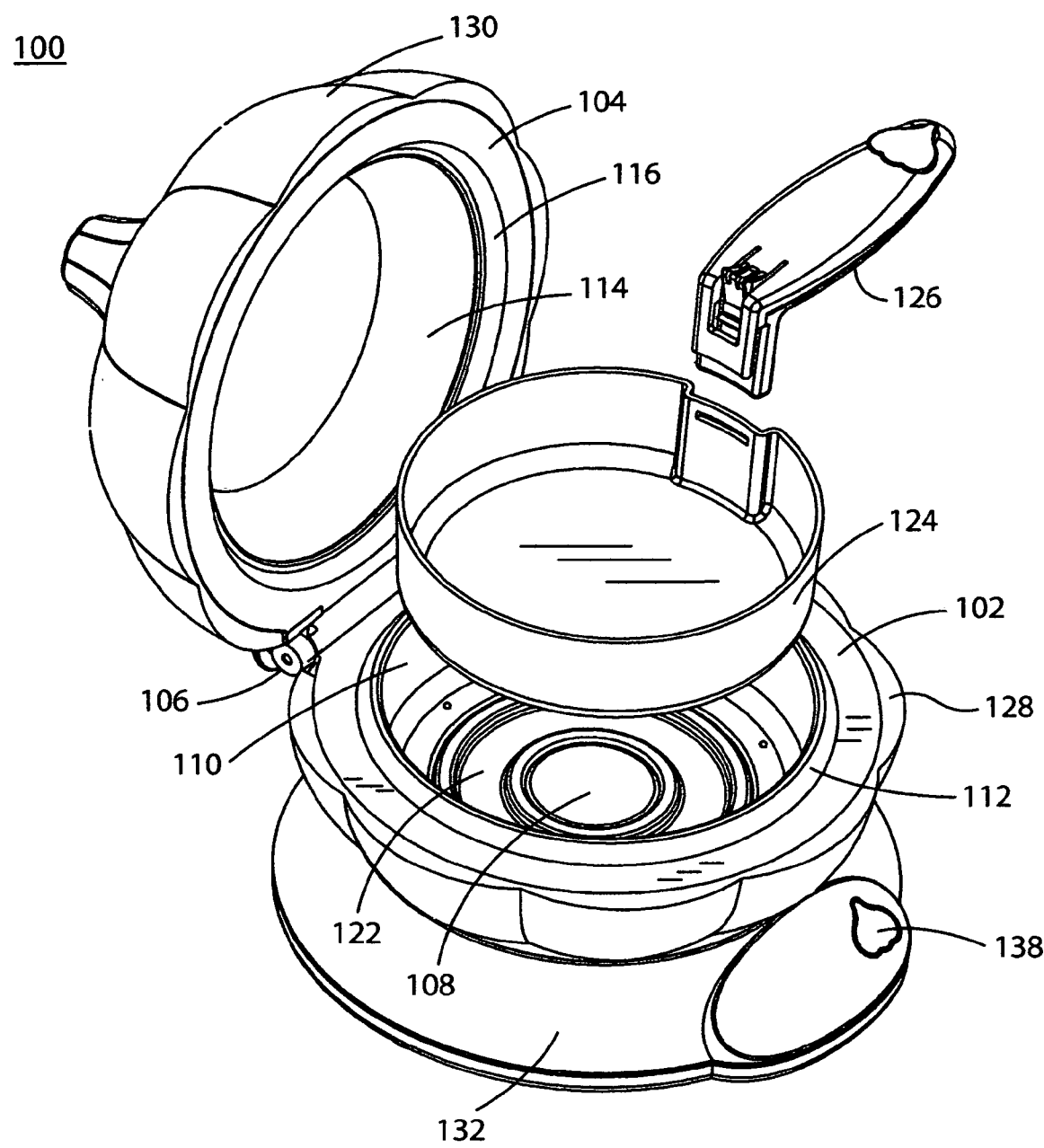
FIG. 1 illustrates an apparatus having an insert and a holder for use in cooking of garlic in accordance with the invention.
Figure 2:
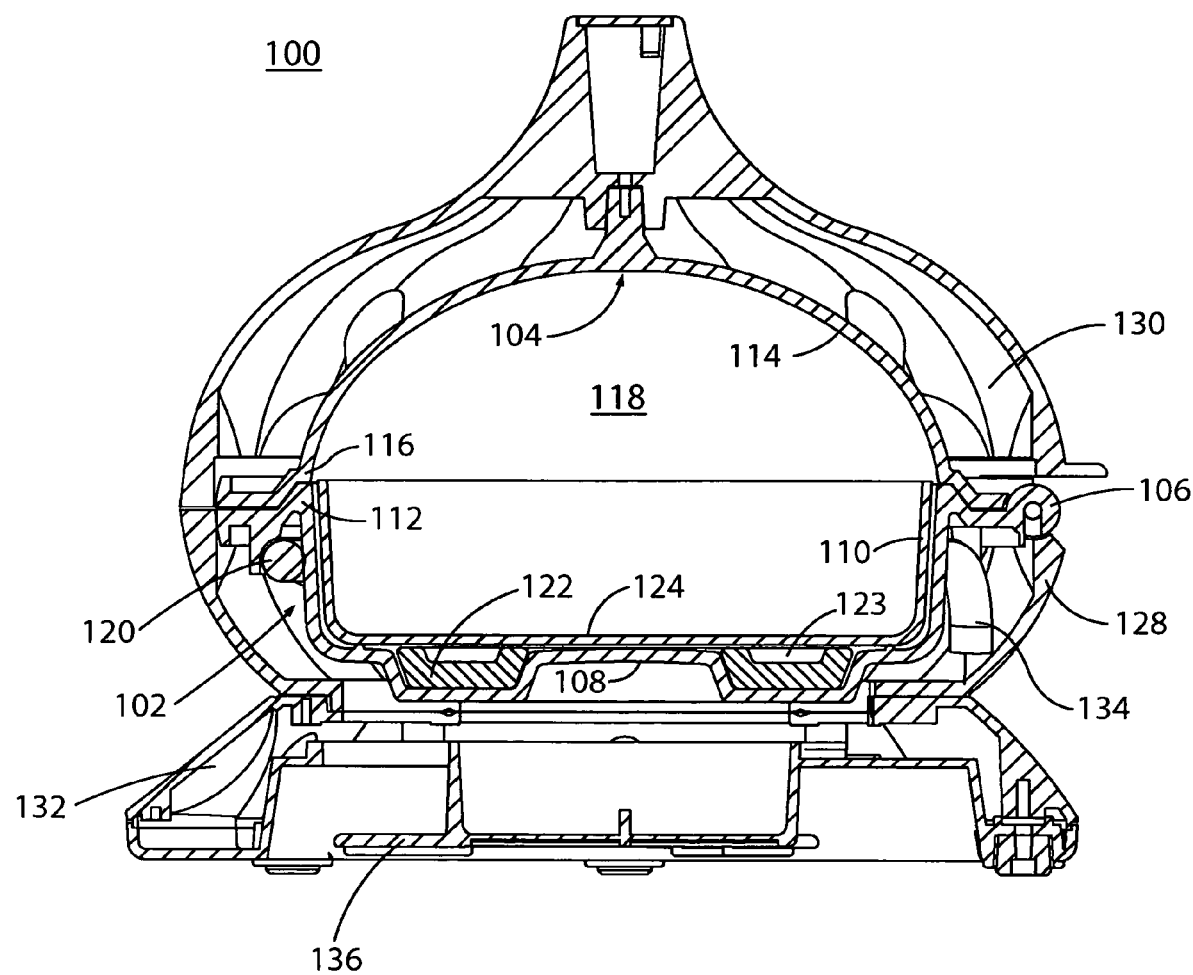
FIG. 2 illustrates a cross-sectional view of an apparatus for cooking garlic in accordance with the invention.

The apparatus 100, as shown in FIG. 1, includes a bowl 102 and a top 104 that are connected together by a hinge 106. A cross-sectional view of the apparatus 100 is as shown in FIG. 2. The bowl 102 has a bottom 108, a circular wall 110, and a beveled rim 112. The top 104 includes a dome 114 and a beveled rim 116. The beveled rims 112, 116 are complementary such that a cooking chamber 118 that resists the escape of heat and vapor is formed when the apparatus is closed by placing the top 104 on the bowl 102. A heating element 120 attaches to an outer surface of the bowl 102. Typically, the bowl 102 and the top 104 are constructive of heat conductive and non-stick material. In addition, the top 104 may be formed from reflective materials such that an inner surface of the top 104 that is adjacent to the cooking chamber 118 reflects heat towards the bowl 102. The use of reflective material facilitates uniform cooking of garlic.

The bottom 108 of the bowl supports an insert 122, which is capable of absorbing water. Typically, the insert is formed from ceramic. In the embodiment, the insert 122 has a circular shape and a groove 123 that may also hold water. The insert 122 supports a holder 124 which is generally bowl shaped so as to nest inside the bowl 102. A detachable handle 126 attaches to a side of the holder 124.

The bowl 102 is mounted in a bottom housing 128, and the top 104 is mounted in a top housing 130. Each housing 128, 130 can have a decorative outer surface. Typically, the housings 128, 130 are formed from heat-resistant materials.

A base 132 supports the bottom housing 128 and is designed and constructed to provide horizontal stability to the apparatus 100 when the top 104 is in either a vertical open position or a horizontal closed position. A timer 138, which is mounted to the base 132, is connected to and controls power to the heating element 120. A cord 134 that is connected to the heating element through the timer 138 is stored in the base 132. Cord storage member 136 attaches to the base 132. In the embodiment the cord storage member 136 is a compartment that is designed to accept the cord 134 by wrapping the cord 134 around elements of the storage member 136.

The apparatus 100 can be operated to produce moist cooked garlic. Moisture can be provided by soaking the insert 122 in water so that the insert is generally saturated with water. The insert 122 with absorbed water is placed in the bowl 102 such that the insert 122 rests on and is supported by the bottom 108 of the bowl 102. Optionally, water may be added in the groove 123.

Garlic bulbs along with cooking oils and other cooking ingredients, as desired, are placed in the holder 124. A removable handle 126 is attached to a side of the holder 124. The removable handle 126 is used to position the holder 124 inside the bowl 102 such that the holder 124 rests on and is supported by the insert 122. When the holder 124 has been positioned in the bowl 102, the handle 126 is removed. Alternatively, the holder 124 may be grasped with a hand and placed on the insert 122.

With garlic, cooking oil, and other cooking ingredients in the holder 124 and with the holder 124 in place on the insert 122 inside the bowl 102, the top 104 is rotated around the hinge 106 and positioned to engage the bowl 102 in a closed position so as to form the cooking chamber 118. In the closed position, the heating element 120 is energized to produce heat by plugging the cord 134 into an energy source and setting the timer 138 so that the garlic inside the cooking chamber 118 cooks. The timer 138 controls the cooking time and disconnects the energy source from the heating element 120 after a desired length of time. Alternatively, cooking of the garlic may be controlled based on temperature of the cooking chamber 118.

During the cooking process moisture is released from the insert 122, and other cooking vapors are produced from the garlic and other ingredients in the holder 124. Some of the moisture and vapor condense on an inner surface of the top 104. When there is enough condensate, droplets form. The shape of the top 104 allows droplets of condensate to return by the force of gravity to the bowl 102 and the holder 124.

After a desired length of cooking, the cooked garlic is removed from the apparatus 100. Preferably, the garlic is removed after the heating element 120 has been disconnected from the energy source. The cooked garlic is removed by disengaging the top 104 from the bowl 102 such that the apparatus is in an open position. The removable handle 126 is attached to the holder 124 such that the holder 124 with the cooked garlic can be removed from the bowl 102. When the apparatus has cooled, the insert 122 is removed for cleaning and reuse.

Figure 3:
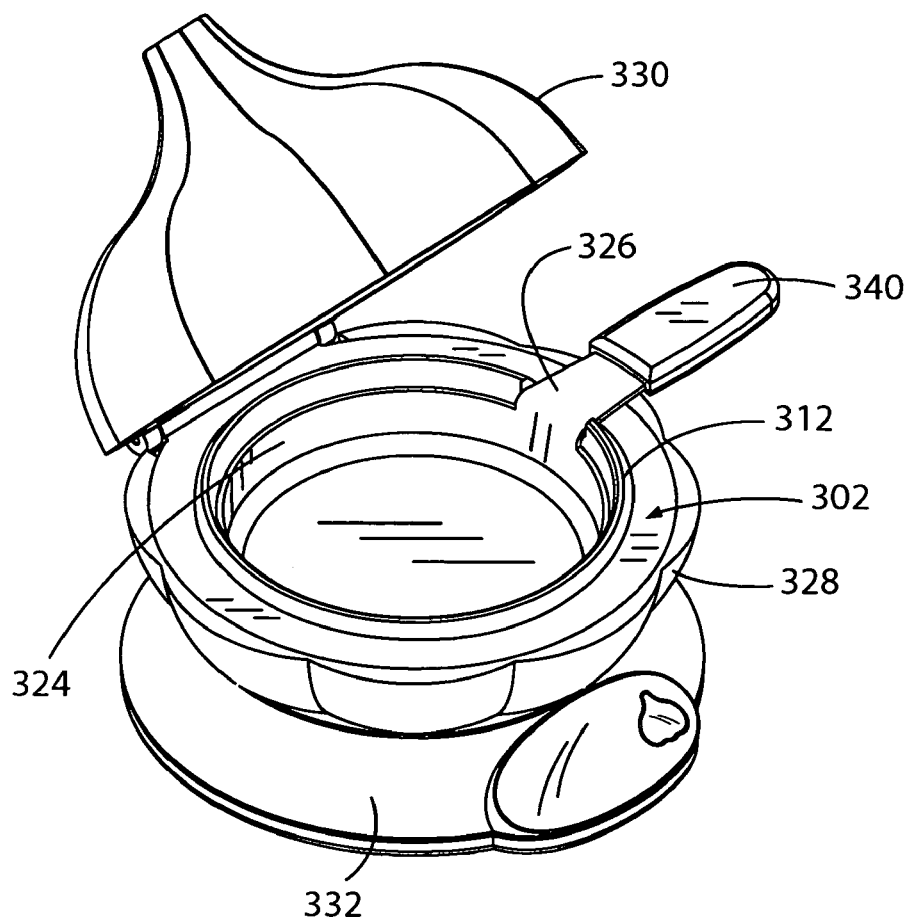
FIG. 3 illustrates an embodiment of the apparatus having a holder with a permanently attached handle in accordance with the invention.
Figure 4:
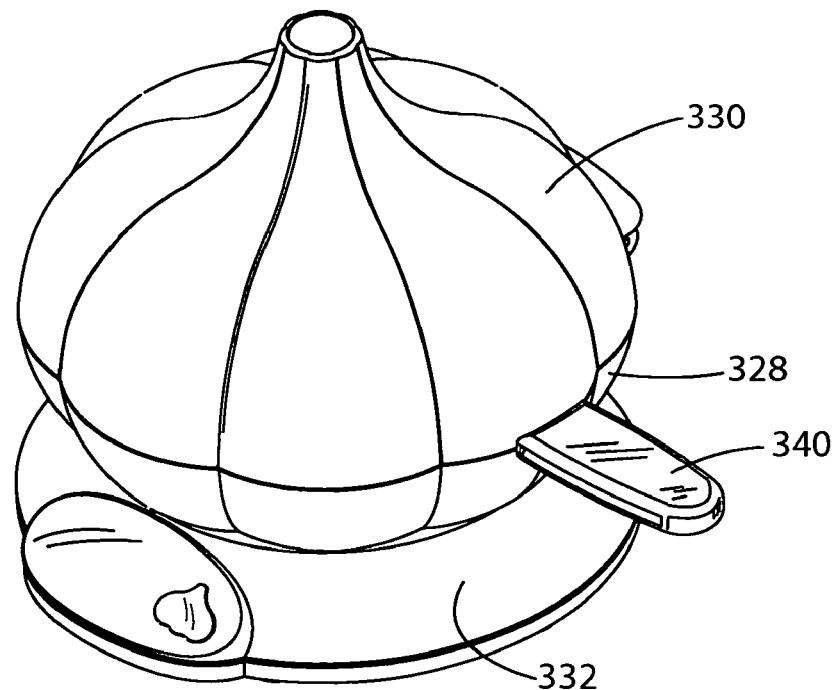
FIG. 4 illustrates an embodiment of the apparatus in a closed position and having a holder with a permanently attached handle in accordance with the invention.

An embodiment of the apparatus 100 with a holder 324 having a permanently attached handle 326 is as shown in FIG. 3 in an open position. The same embodiment with the apparatus in a closed position is as shown in FIG. 4. The holder 324 rests on an insert (not shown) in the bottom of a bowl 302. The bowl 302 has a beveled rim 312 that is complementary to a rim (not shown) of a top that is mounted inside a top housing 330. The bowl 302 is mounted in a bottom housing 328 that is attached to a base 332. The bowl 302 and the bottom housing 328 have openings that permit the handle 326 to be positioned so as to extend from inside the bowl 302 to past an outer surface of the bottom housing 328. Alternatively, the top (not shown) and top housing 330 may be designed and constructed to allow the handle 326 to extend from inside the apparatus to outside the apparatus.

A grip 340 is attached to an end of the handle 326 that extends outside the apparatus 100. The grip 340 is made of insulating material to allow grasping the handle 326 and removing the holder 324 containing cooked garlic while still hot. The grip 340 is designed to be outside of the apparatus when the apparatus is in the closed position.

Figure 5:
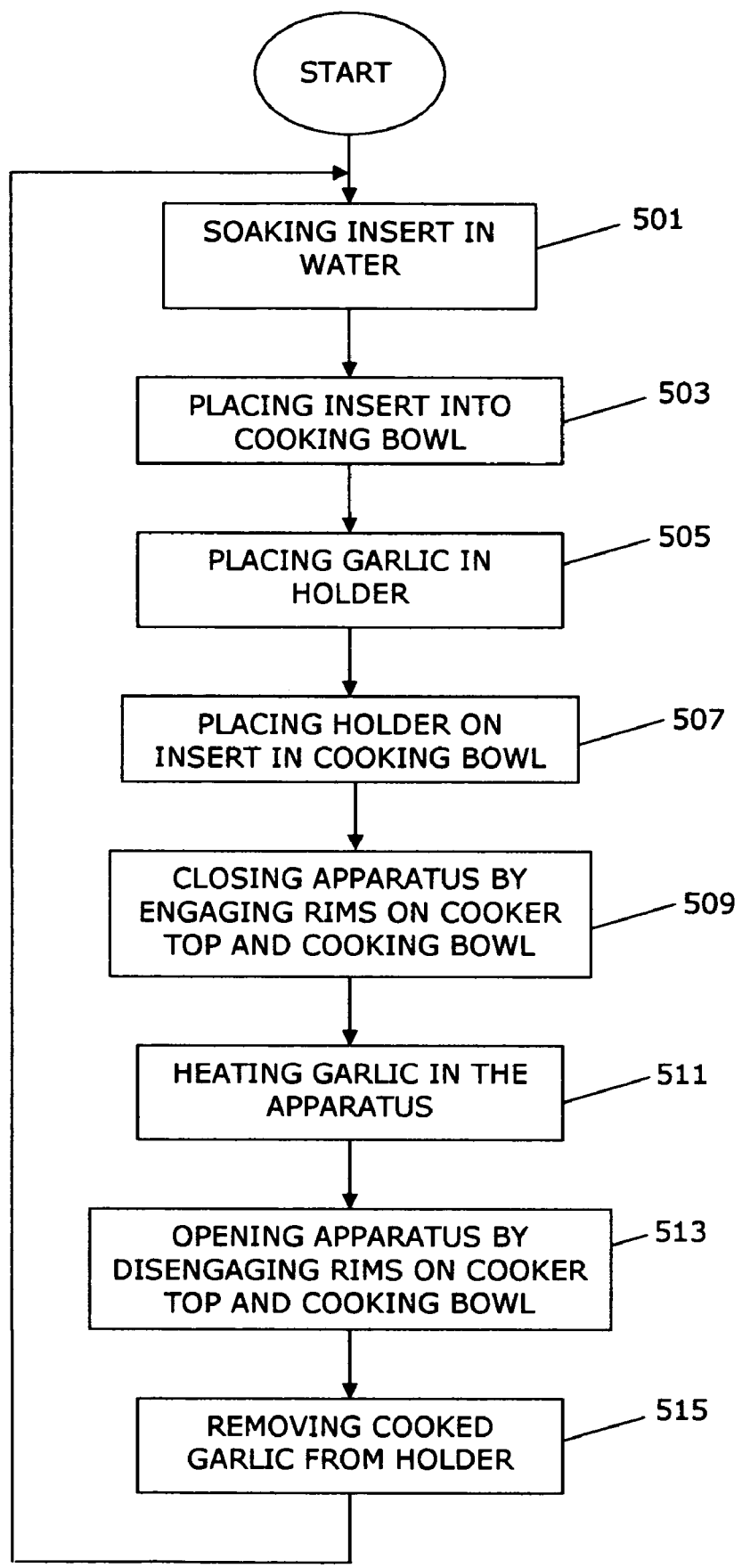
FIG. 5 illustrates a flow diagram for a method of cooking garlic to produce moist cooked garlic in accordance with the invention.

A flow diagram of the steps of a method for use in cooking garlic is as shown in FIG. 5. In a method of the present invention, garlic is cooked in a moisture laden cooking chamber 118 that is formed when the top 104 is positioned on the bowl 102. At step 501, an insert 122 is soaked in water such that water is absorbed by the insert 122. The absorbed water is released during the cooking of garlic so as to keep the garlic moist. Alternatively, the insert 122 may be designed to hold free water in addition to absorbed water. At step 503, the insert 122, which is laden with water, is placed into the bowl 102 so that the insert 122 is supported by the bottom 108 of the cooking bowl 102. At step 505, garlic is placed in a holder 124. In addition, basting oils, spices, and other cooking ingredients can be placed in the holder 124 depending on desired cooking result.

At step 507 the handle 126 is used to place the garlic containing holder 124 in the bowl 102. The insert 122 rests on the bottom 108 of the bowl 102, and the handle 126 is removed. Alternatively, the handle 126 may be permanently attached to the holder 124 and extend outside the apparatus during the cooking of the garlic. The apparatus is closed at step 509 by positioning the top 104 on the bowl 102 such that the complementary bowl rim 112 and the top rim 116 engage. The engaged rims form a seal that resists the escape of heat and moisture from the cooking chamber 118 while garlic is cooked.

The garlic is cooked at step 511 by supplying heat to the bowl 102. For an electric apparatus, the heat is generated by electric power. Alternatively, the apparatus can be designed to use natural gas, and other energy sources. For electric heating, energy is supplied to the heating element 120 by connecting the cord 134 to a power source. The length of cooking can be controlled by a timer 138.

Once the garlic is cooked the apparatus 100 is opened at step 513 by disengaging the top 104 from the bowl 102. At step 515, the holder 124, which contains the cooked garlic, is removed from the apparatus. The holder 124 may be removed by the use of the removable handle 126, a permanently attached handle, or other appropriate means. The cooked garlic is removed from the holder 124 for consumption or for use in preparation of a meal or other use. The holder 124, the insert 122, the bowl 102, and the top 104 may be cleaned, and the apparatus stored for later use.

An advantage of the present invention is energy efficient cooking of garlic that does not dry out the garlic during the cooking process. The apparatus 100 is compact compared to the use of a conventional oven to cook garlic. The compact size of the apparatus allows for energy efficient cooking of a few bulbs of garlic as compared to cooking garlic in a conventional oven. The apparatus advantageously decreases cooking time because heat is concentrated close to the garlic, and minimal heat is given off to the surrounding room. The apparatus allows cooking aroma to escape without excess loss of heat and moisture. The use of a water absorptive insert results in cooked garlic that is moist and tasty. Construction of apparatus components with non-stick materials reduces clean-up time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus comprising:
   a bowl that is mounted in a housing wherein in the bowl comprises a bottom, a circular wall attached to the bottom, and a first beveled rim attached to the circular wall;

a heating element disposed near an outer surface of the bowl;

a top that is mounted in a top housing and hingedly connected to the bottom bowl wherein the top comprises a dome and a second beveled rim attached to the dome such that when the top is positioned on the bowl the second beveled rim engages the first beveled rim to form a cooking chamber that resists escape of heat and moisture and allows the movement of condensate formed on an inside surface of the top to return to the bowl;

an insert that is capable of holding water and is supported by the bottom of the bowl; and a holder that is supported by the insert.

2. The apparatus of claim 1, wherein the insert is formed from heat resistant material.

3. The apparatus of claim 2, wherein the heat resistant material is ceramic.

4. The apparatus of claim 1, further comprising a handle that is removably attached to the holder.

5. The apparatus of claim 1, wherein the holder can hold at least one garlic bulb.

6. The apparatus of claim 1, wherein the top and the bowl are formed from a heat conductive material.

7. The apparatus of claim 1, wherein the top is formed of heat reflective material.

8. The apparatus of claim 1, wherein the dome of the top is proximately close to the bottom of the bowl such that garlic is uniformly cooked when the top is closed on the bowl.

9. The apparatus of claim 1, wherein the top housing is formed from a heat resistant material.

10. The apparatus of claim 1, wherein the bottom housing is formed from a heat resistant material.

11. The apparatus of claim 1, further comprising a first decorative outer surface attached to the top housing.

12. The apparatus of claim 1, further comprising a second decorative outer surface attached to the bottom housing.

13. The apparatus of claim 1, further comprising a cord connected to the heating element wherein the cord is used to connect the heating element to an energy source.

14. The apparatus of claim 1, further comprising a base attached to the bottom housing wherein the base provides horizontal stability to the apparatus.

15. The apparatus of claim 14, further comprising a timer that is mounted to the base and is connected to the heating element.

16. The apparatus of claim 14, further comprising a cord storage member that is formed inside the base.

17. A method of cooking garlic comprising the steps of:

soaking an insert in water where in the insert is at least partially saturated with water;

placing the insert in a bowl that in mounted in a bottom housing;

placing garlic in a holder;

placing the holder on the insert in the bowl;

closing the apparatus by positioning a top on the bowl such that complementary rims on the top and bowl are engaged;

heating garlic in the apparatus when the apparatus is in a closed position;

opening the apparatus such that complementary rims on the top and bowl are disengaged; and removing cooked garlic from the holder while the apparatus is in an open position.

18. The method of claim 17, further comprising the step of controlling cooking time with a timer connected to the heating element.

19. The method of claim 17, further comprising the step of placing oil and spices in the holder.

20. The method of claim 17, wherein heating is provided by an electric heating element connected to an electric power source.

* * * * *